(12) United States Patent
Pekrul

(10) Patent No.: US 8,523,547 B2
(45) Date of Patent: Sep. 3, 2013

(54) ROTARY ENGINE EXPANSION CHAMBER APPARATUS AND METHOD OF OPERATION THEREFOR

(76) Inventor: Merton W. Pekrul, Mesa, AZ (US)

( * ) Notice: Subject to any disclaimer, the term of this patent is extended or adjusted under 35 U.S.C. 154(b) by 41 days.

(21) Appl. No.: 13/014,167

(22) Filed: Jan. 26, 2011

(65) Prior Publication Data

US 2011/0116958 A1     May 19, 2011

Related U.S. Application Data

(63) Continuation-in-part of application No. 12/705,731, filed on Feb. 15, 2010, now Pat. No. 8,375,720, which is a continuation of application No. 11/388,361, filed on Mar. 24, 2006, now Pat. No. 7,694,520, which is a continuation-in-part of application No. 11/077,289, filed on Mar. 9, 2005, now Pat. No. 7,055,327.

(60) Provisional application No. 61/304,462, filed on Feb. 14, 2010, provisional application No. 61/311,319, filed on Mar. 6, 2010, provisional application No. 61/316,164, filed on Mar. 22, 2010, provisional application No. 61/316,241, filed on Mar. 22, 2010, provisional application No. 61/316,718, filed on Mar. 23, 2010, provisional application No. 61/323,138, filed on Apr. 12, 2010, provisional application No. 61/330,355, filed on May 2, 2010.

(51) Int. Cl.
*F01C 21/00* (2006.01)
*F01C 1/00* (2006.01)

(52) U.S. Cl.
USPC .............................................. 418/75; 418/259

(58) Field of Classification Search
USPC ...................... 418/75–82, 259–269
See application file for complete search history.

(56) References Cited

U.S. PATENT DOCUMENTS

| | | | |
|---|---|---|---|
| 122,713 A | | 1/1872 | Faucett |
| 1,953,378 A | | 4/1934 | Vias |
| 2,545,238 A | | 3/1951 | MacMillin |
| 2,588,342 A | | 3/1952 | Bidwell |
| 2,636,480 A | * | 4/1953 | Becker ........................... 418/81 |
| 2,778,317 A | | 1/1957 | Hamilton |
| 2,855,857 A | * | 10/1958 | Sung .............................. 418/77 |
| 2,902,943 A | * | 9/1959 | Fuerst et al. ................... 418/81 |
| 2,918,009 A | * | 12/1959 | Crevoisier ...................... 418/15 |
| 2,924,178 A | * | 2/1960 | Hogan ............................ 418/15 |
| 3,183,843 A | | 5/1965 | Cockburn |
| 3,237,528 A | | 3/1966 | Rose |
| 3,295,752 A | | 1/1967 | Bellmer |
| 3,381,891 A | | 5/1968 | Bellmer |

(Continued)

*Primary Examiner* — Hoang Nguyen
(74) *Attorney, Agent, or Firm* — Kevin Hazen

(57) ABSTRACT

An engine is described for operation on a fuel expanding about adiabatically in a power stroke of the engine. To aid the power stroke efficiency, the rotary engine contains one or more of a rotor configured to rotate in a stator, the rotor offset along both an x-axis and a y-axis relative to a center of the stator, a vane configured to span a distance between the rotor and the stator, where the inner wall of the stator further comprises at least one of: a first cut-out in the housing at the initiation of the power stroke, use of a build-up in the housing at the end of the power stroke, and/or use of a second cut-out in the housing at the completion of rotation of the rotor in the engine. The engine yields a cross-sectional area expanding during a portion of the power stroke at about the Fibonacci ratio.

20 Claims, 7 Drawing Sheets

(56) References Cited

U.S. PATENT DOCUMENTS

| | | | |
|---|---|---|---|
| 3,422,726 A * | 1/1969 | Gottlieb | ............... 418/82 |
| 3,450,108 A | 6/1969 | Rich | |
| 3,516,769 A | 6/1970 | Korhonen | |
| 3,539,281 A | 11/1970 | Kramer | |
| 3,585,973 A | 6/1971 | Klover | |
| 3,809,020 A | 5/1974 | Takitani | |
| 3,869,231 A | 3/1975 | Adams | |
| 3,873,253 A | 3/1975 | Eickmann | |
| 3,883,277 A | 5/1975 | Keller | |
| 3,950,950 A | 4/1976 | Doerner | |
| 3,951,111 A | 4/1976 | Lester | |
| 3,951,598 A * | 4/1976 | Arashi et al. | ............... 8/499 |
| 3,958,422 A | 5/1976 | Kelly | |
| 3,970,051 A | 7/1976 | Kirkman | |
| 3,975,914 A | 8/1976 | Tufts | |
| 3,976,037 A | 8/1976 | Hojnowski | |
| 3,986,483 A | 10/1976 | Larson | |
| 4,005,951 A | 2/1977 | Swinkels | |
| 4,033,299 A | 7/1977 | Manzoni | |
| 4,033,300 A | 7/1977 | Larson | |
| 4,046,493 A | 9/1977 | Alund | |
| 4,047,856 A | 9/1977 | Hoffman | |
| 4,064,841 A | 12/1977 | Jenkins | |
| 4,106,472 A | 8/1978 | Rusk | |
| 4,115,045 A | 9/1978 | Wyman | |
| 4,132,512 A | 1/1979 | Roberts | |
| 4,168,941 A | 9/1979 | Rettew | |
| 4,178,900 A | 12/1979 | Larson | |
| 4,191,032 A | 3/1980 | August | |
| 4,203,410 A | 5/1980 | Ramer | |
| 4,242,065 A | 12/1980 | Ishizuka | |
| 4,290,268 A | 9/1981 | Lowther | |
| 4,353,337 A | 10/1982 | Rosaen | |
| 4,354,809 A | 10/1982 | Sundberg | |
| 4,355,965 A | 10/1982 | Lowther | |
| 4,367,629 A | 1/1983 | Cann | |
| 4,399,863 A | 8/1983 | Banasiuk | |
| 4,410,305 A * | 10/1983 | Shank et al. | ............... 418/150 |
| 4,437,308 A | 3/1984 | Fischer | |
| 4,486,158 A | 12/1984 | Maruyama | |
| 4,492,541 A | 1/1985 | Mallen-Herrero | |
| 4,515,123 A | 5/1985 | Taylor | |
| 4,548,171 A | 10/1985 | Larson | |
| 4,580,950 A | 4/1986 | Sumikawa | |
| 4,638,776 A | 1/1987 | Crittenden | |
| 4,721,079 A | 1/1988 | Lien | |
| 4,760,701 A | 8/1988 | David | |
| 4,792,295 A | 12/1988 | Joyce, Sr. | |
| 4,804,317 A | 2/1989 | Smart | |
| 4,813,388 A | 3/1989 | Yang | |
| 4,817,567 A | 4/1989 | Wilks | |
| 4,860,704 A | 8/1989 | Slaughter | |
| 5,039,290 A | 8/1991 | Nardi | |
| 5,102,314 A * | 4/1992 | Staudenrausch | ............... 418/15 |
| 5,116,208 A | 5/1992 | Parme | |
| 5,181,844 A | 1/1993 | Bishop | |
| 5,224,850 A | 7/1993 | Pie | |
| 5,235,945 A | 8/1993 | Testea | |
| 5,277,158 A | 1/1994 | Pangman | |
| 5,336,047 A | 8/1994 | Kolhouse | |
| 5,359,966 A | 11/1994 | Jensen | |
| 5,379,736 A | 1/1995 | Anderson | |
| 5,408,824 A | 4/1995 | Schlote | |
| 5,419,691 A | 5/1995 | Lien | |
| 5,501,586 A | 3/1996 | Edwards | |
| 5,524,587 A | 6/1996 | Mallen | |
| 5,540,199 A | 7/1996 | Penn | |
| 5,558,511 A | 9/1996 | Hedelin | |
| 5,567,139 A | 10/1996 | Weatherston | |
| 5,571,005 A | 11/1996 | Stoll | |
| 5,571,244 A | 11/1996 | Andres | |
| 5,634,783 A | 6/1997 | Beal | |
| 5,681,153 A * | 10/1997 | Weatherston | ............... 417/462 |
| 5,720,251 A | 2/1998 | Round | |
| 5,755,196 A | 5/1998 | Klassen | |
| 5,758,501 A | 6/1998 | Jirnov | |
| 5,794,583 A | 8/1998 | Ichieda | |
| 5,882,183 A | 3/1999 | Andres | |
| 5,937,820 A | 8/1999 | Nagata | |
| 5,946,916 A | 9/1999 | Ven | |
| 5,968,378 A | 10/1999 | Jensen | |
| 6,006,009 A | 12/1999 | Friedheim | |
| 6,036,463 A | 3/2000 | Klassen | |
| 6,070,565 A | 6/2000 | Miniere | |
| 6,086,347 A | 7/2000 | Ryska | |
| 6,106,255 A | 8/2000 | Viegas | |
| 6,164,263 A | 12/2000 | Saint-Hilaire | |
| 6,169,852 B1 | 1/2001 | Liao | |
| 6,247,443 B1 | 6/2001 | Pelleja | |
| 6,354,262 B2 | 3/2002 | Wade | |
| 6,364,646 B1 | 4/2002 | Kirtley | |
| 6,497,557 B2 | 12/2002 | Aden | |
| 6,530,211 B2 | 3/2003 | Holtzapple et al. | |
| 6,546,908 B1 | 4/2003 | Pekau | |
| 6,565,310 B1 | 5/2003 | Davidow | |
| 6,589,033 B1 | 7/2003 | Johnson | |
| 6,594,997 B2 | 7/2003 | Romanelli | |
| 6,601,570 B2 | 8/2003 | Zetmeir | |
| 6,634,873 B2 | 10/2003 | Klassen | |
| 6,659,065 B1 | 12/2003 | Renegar | |
| 6,722,182 B1 | 4/2004 | Buettner | |
| 6,729,296 B2 | 5/2004 | King | |
| 6,739,852 B1 | 5/2004 | Klassen | |
| 6,772,728 B2 | 8/2004 | Al-Hawaj | |
| 6,773,226 B2 | 8/2004 | Al-Hawaj | |
| 6,786,036 B2 | 9/2004 | Kight | |
| 6,799,549 B1 | 10/2004 | Patterson | |
| 6,886,527 B2 | 5/2005 | Regev | |
| 6,899,075 B2 | 5/2005 | Saint-Hilaire | |
| 7,073,477 B2 | 7/2006 | Gorski | |
| 7,255,083 B2 | 8/2007 | Hamada | |
| 7,341,041 B2 | 3/2008 | Pekau | |
| 7,395,805 B2 | 7/2008 | MacMurray | |
| 7,412,831 B2 | 8/2008 | Ullyott | |
| 7,578,278 B2 | 8/2009 | Peitzke | |
| 7,674,101 B2 | 3/2010 | Maeng | |
| 7,707,987 B2 | 5/2010 | Guthrie | |
| 7,713,042 B2 | 5/2010 | Rodgers | |
| 7,845,332 B2 | 12/2010 | Wang | |
| 8,360,759 B2 | 1/2013 | Pekrul | |
| 8,360,760 B2 | 1/2013 | Pekrul | |
| 8,375,720 B2 | 2/2013 | Pekrul | |
| 2006/0102139 A1 | 5/2006 | Garcia | |
| 2008/0041056 A1 | 2/2008 | Carnahan | |
| 2011/0116958 A1 | 5/2011 | Pekrul | |
| 2011/0142702 A1 | 6/2011 | Pekrul | |
| 2011/0155096 A1 | 6/2011 | Pekrul | |
| 2011/0165007 A1 | 7/2011 | Pekrul | |
| 2011/0171051 A1 | 7/2011 | Pekrul | |
| 2011/0176947 A1 | 7/2011 | Pekrul | |
| 2011/0200473 A1 | 8/2011 | Pekrul | |
| 2012/0230822 A1 | 9/2012 | Pekrul | |

\* cited by examiner

ROTARY ENGINE EXPANSION CHAMBER APPARATUS AND METHOD OF OPERATION THEREFOR

CROSS-REFERENCES TO RELATED APPLICATIONS

This application:
is a continuation-in-part of U.S. patent application Ser. No. 12/705,731 filed Feb. 15, 2010, now U.S. Pat. No. 8,375,720 which is a continuation of U.S. patent application Ser. No. 11/388,361 filed Mar. 24, 2006, now U.S. Pat. No. 7,694,520, which is a continuation-in-part of U.S. patent application Ser. No. 11/077,289 filed Mar. 9, 2005, now U.S. Pat. No. 7,055,327;
claims the benefit of U.S. provisional patent application No. 61/304,462 filed Feb. 14, 2010;
claims the benefit of U.S. provisional patent application No. 61/311,319 filed Mar. 6, 2010;
claims the benefit of U.S. provisional patent application No. 61/316,164 filed Mar. 22, 2010;
claims the benefit of U.S. provisional patent application No. 61/316,241 filed Mar. 22, 2010;
claims the benefit of U.S. provisional patent application No. 61/316,718 filed Mar. 23, 2010;
claims the benefit of U.S. provisional patent application No. 61/323,138 filed Apr. 12, 2010; and
claims the benefit of U.S. provisional patent application No. 61/330,355 filed May 2, 2010,
all of which are incorporated herein in their entirety by this reference thereto.

TECHNICAL FIELD OF THE INVENTION

The present invention relates to the field of rotary engines. More specifically, the present invention relates to the field of rotary chamber devices and/or rotary engines having an offset rotation axis.

BACKGROUND OF THE INVENTION

The controlled expansion of gases forms the basis for the majority of non-electrical rotational engines in use today. These engines include reciprocating, rotary, and turbine engines, and may be driven by heat, such as with heat engines, or other forms of energy. Heat engines optionally use combustion, solar, geothermal, nuclear, and/or forms of thermal energy. Further, combustion-based heat engines optionally utilize either an internal or an external combustion system, which are further described infra.

Internal Combustion Engines

Internal combustion engines derive power from the combustion of a fuel within the engine itself. Typical internal combustion engines include reciprocating engines, rotary engines, and turbine engines.

Internal combustion reciprocating engines convert the expansion of burning gases, such as an air-fuel mixture, into the linear movement of pistons within cylinders. This linear movement is subsequently converted into rotational movement through connecting rods and a crankshaft. Examples of internal combustion reciprocating engines are the common automotive gasoline and diesel engines.

Internal combustion rotary engines use rotors and chambers to more directly convert the expansion of burning gases into rotational movement. An example of an internal combustion rotary engine is a Wankel engine, which utilizes a triangular rotor that revolves in a chamber, instead of pistons within cylinders. The Wankel engine has fewer moving parts and is generally smaller and lighter, for a given power output, than an equivalent internal combustion reciprocating engine.

Internal combustion turbine engines direct the expansion of burning gases against a turbine, which subsequently rotates. An example of an internal combustion turbine engine is a turboprop aircraft engine, in which the turbine is coupled to a propeller to provide motive power for the aircraft.

Internal combustion turbine engines are often used as thrust engines, where the expansion of the burning gases exit the engine in a controlled manner to produce thrust. An example of an internal combustion turbine/thrust engine is the turbofan aircraft engine, in which the rotation of the turbine is typically coupled back to a compressor, which increases the pressure of the air in the air-fuel mixture and increases the resultant thrust.

All internal combustion engines suffer from poor efficiency; only a small percentage of the potential energy is released during combustion as the combustion is invariably incomplete. Of energy released in combustion, only a small percentage is converted into rotational energy while the rest is dissipated as heat.

If the fuel used in an internal combustion engine is a typical hydrocarbon or hydrocarbon-based compound, such as gasoline, diesel oil, and/or jet fuel, then the partial combustion characteristic of internal combustion engines causes the release of a range of combustion by-products pollutants into the atmosphere via an engine exhaust. To reduce the quantity of pollutants, a support system including a catalytic converter and other apparatus is typically necessitated. Even with the support system, a significant quantity of pollutants are released into the atmosphere as a result of incomplete combustion when using an internal combustion engine.

Because internal combustion engines depend upon the rapid and explosive combustion of fuel within the engine itself, the engine must be engineered to withstand a considerable amount of heat and pressure. These are drawbacks that require a more robust and more complex engine over external combustion engines of similar power output.

External Combustion Engines

External combustion engines derive power from the combustion of a fuel in a combustion chamber separate from the engine. A Rankine-cycle engine typifies a modern external combustion engine. In a Rankine-cycle engine, fuel is burned in the combustion chamber and used to heat a liquid at substantially constant pressure. The liquid is vaporized to a gas, which is passed into the engine where it expands. The desired rotational energy and/or power is derived from the expansion energy of the gas. Typical external combustion engines also include reciprocating engines, rotary engines, and turbine engines, described infra.

External combustion reciprocating engines convert the expansion of heated gases into the linear movement of pistons within cylinders and the linear movement is subsequently converted into rotational movement through linkages. A conventional steam locomotive engine is used to illustrate functionality of an external combustion open-loop Rankine-cycle reciprocating engine. Fuel, such as wood, coal, or oil, is burned in a combustion chamber or firebox of the locomotive and is used to heat water at a substantially constant pressure. The water is vaporized to a gas or steam form and is passed into the cylinders. The expansion of the gas in the cylinders drives the pistons. Linkages or drive rods transform the piston movement into rotary power that is coupled to the wheels of the locomotive and is used to propel the locomotive down the track. The expanded gas is released into the atmosphere in the form of steam.

External combustion rotary engines use rotors and chambers instead of pistons, cylinders, and linkages to more directly convert the expansion of heated gases into rotational movement.

External combustion turbine engines direct the expansion of heated gases against a turbine, which then rotates. A modern nuclear power plant is an example of an external-combustion closed-loop Rankine-cycle turbine engine. Nuclear fuel is consumed in a combustion chamber known as a reactor and the resultant energy release is used to heat water. The water is vaporized to a gas, such as steam, which is directed against a turbine forcing rotation. The rotation of the turbine drives a generator to produce electricity. The expanded steam is then condensed back into water and is typically made available for reheating.

With proper design, external combustion engines are more efficient than corresponding internal combustion engines. Through the use of a combustion chamber, the fuel is more thoroughly consumed, releasing a greater percentage of the potential energy. Further, more thorough consumption means fewer combustion by-products and a corresponding reduction in pollutants.

Because external combustion engines do not themselves encompass the combustion of fuel, they are optionally engineered to operate at a lower pressure and a lower temperature than comparable internal combustion engines, which allows the use of less complex support systems, such as cooling and exhaust systems. The result is external combustion engines that are simpler and lighter for a given power output compared with internal combustion engines.

External Combustion Engine Types
Turbine Engines

Typical turbine engines operate at high rotational speeds. The high rotational speeds present several engineering challenges that typically result in specialized designs and materials, which adds to system complexity and cost. Further, to operate at low-to-moderate rotational speeds, turbine engines typically utilize a step-down transmission of some sort, which again adds to system complexity and cost.

Reciprocating Engines

Similarly, reciprocating engines require linkages to convert linear motion to rotary motion resulting in complex designs with many moving parts. In addition, the linear motion of the pistons and the motions of the linkages produce significant vibration, which results in a loss of efficiency and a decrease in engine life. To compensate, components are typically counterbalanced to reduce vibration, which again increases both design complexity and cost.

Heat Engines

Typical heat engines depend upon the diabatic expansion of the gas. That is, as the gas expands, it loses heat. This diabatic expansion represents a loss of energy.

Patents and patent applications related to the current invention are summarized here.

Rotary Engine Types

R. Hoffman, "Rotary Steam Engine", U.S. Pat. No. 4,047,856 (Sep. 13, 1977) describes a unidirectional rotary steam power unit using a power fluid supplied through a hollow rotor and is conducted to working chambers using passages in walls of the housing controlled by seal means carried by the rotor.

D. Larson, "Rotary Internal Combustion Engine", U.S. Pat. No. 4,178,900 (Dec. 18, 1979) describes a rotary internal combustion engine configured with a stator and two pairs of sockets. Wedges are affixed to each socket. Rotation of an inner rotor, the sides of the rotor defining a cam, allows pivoting of the wedges, which alters chamber sizes between the rotor and the stator.

J. Ramer, "Method for Operating a Rotary Engine", U.S. Pat. No. 4,203,410 (May 20, 1980) describes a rotary engine having a pair of spaced coaxial rotors in a housing, each rotor rotating separate rotor chambers. An axially extending chamber in the housing communicates the rotor chambers.

F. Lowther, "Vehicle Braking and Kinetic Energy Recovery System", U.S. Pat. No. 4,290,268 (Sep. 22, 1981) describes an auxiliary kinetic energy recovery system incorporating a rotary sliding vane engine and/or compressor, using compressed air or electrical energy recovered from the kinetic energy of the braking system, with controls including the regulation of the inlet aperture.

O. Rosaen, "Rotary Engine", U.S. Pat. No. 4,353,337 (Oct. 12, 1982) describes a rotary internal combustion engine having an elliptically formed internal chamber, with a plurality of vane members slidably disposed within the rotor, constructed to ensure a sealing engagement between the vane member and the wall surface.

J. Herrero, et. al., "Rotary Electrohydraulic Device With Axially Sliding Vanes", U.S. Pat. No. 4,492,541 (Jan. 8, 1985) describes a rotary electrohydraulic device applicable as braking or slackening device.

O. Lien, "Rotary Engine", U.S. Pat. No. 4,721,079 (Jan. 26, 1988) describes a rotary engine configured with rotors, forming opposite sides of the combustion chambers, rotated on an angled, non-rotatable shaft through which a straight power shaft passes.

K. Yang, "Rotary Engine", U.S. Pat. No. 4,813,388 (Mar. 21, 1989) describes an engine having a pair of cylindrical hubs interleaved in a mesh type rotary engine, each of the cylindrical hubs defining combustion and expansion chambers.

G. Testea, et. al., "Rotary Engine System", U.S. Pat. No. 5,235,945 (Aug. 17, 1993) describes an internal combustion rotary engine having an offset rotor for rotation about an axis eccentric to a central axis of a cylindrical cavity that provides the working chambers of the engine.

R. Weatherston, "Two Rotor Sliding Vane Compressor", U.S. Pat. No. 5,681,153 (Oct. 28, 1997) describes a two-rotor sliding member rotary compressor including an inner rotor, an outer rotor eccentric to the inner rotor, and at least three sliding members between the inner rotor and the outer rotor.

G. Round, et. al., "Rotary Engine and Method of Operation", U.S. Pat. No. 5,720,251 (Feb. 24, 1998) describes a rotary engine having an inner rotor and an outer rotor with the outer rotor being offset from the inner rotor. The outer rotor is configured with inward projecting lobes forming seals with outward extending radial arms of the inner rotor, the lobes and arms forming chambers of the engine.

M. Ichieda, "Side Pressure Type Rotary Engine", U.S. Pat. No. 5,794,583 (Aug. 18, 1998) describes a side pressure type rotary engine configured with a suction port and an exhaust port. A suction blocking element and exhaust blocking element are timed for movement and use in synchronization with rotor rotation to convert expansive forces into a rotational force.

J. Pelleja, "Rotary Internal Combustion Engine and Rotary Internal Combustion Engine Cycle", U.S. Pat. No. 6,247,443 B1 (Jun. 19, 2001) describes an internal combustion rotary engine configured with a set of push rod vanes arranged in a staggered and radial arrangement relative to a drive shaft of the engine.

R. Pekau, "Variable Geometry Toroidal Engine", U.S. Pat. No. 6,546,908 B1 (Apr. 15, 2003) describes a rotary engine including a single toroidal cylinder and a set of pistons on a rotating circular piston assembly where the pistons are mechanically extendable and retractable in synchronization with opening and closing of a disk valve.

M. King, "Variable Vane Rotary Engine", U.S. Pat. No. 6,729,296 B2 (May 4, 2004) describes a rotary engine including: (1) a concentric stator sandwiched between a front wall and an aft wall enclosing a cylindrical inner space and (2) a network of combustors stationed about the periphery of the stator.

O. Al-Hawaj, "Supercharged Radial Vane Rotary Device", U.S. Pat. No. 6,772,728 B2 (Aug. 10, 2004) describes two and four phase internal combustion engines having a donut shaped rotor assembly with an integrated axial pump portion, incorporating cam followers.

M. Kight, "Bimodal Fan, Heat Exchanger and Bypass Air Supercharging for Piston or Rotary Driven Turbine", U.S. Pat. No. 6,786,036 B2 (Sep. 7, 2004) describes a turbine for aircraft use where the turbine includes a heat exchanger with minimal drag for increasing the engine effectiveness through an enthalpy increase on the working fluid.

S. Wang, "Rotary Engine with Vanes Rotatable by Compressed Gas Injected Thereon", U.S. Pat. No. 7,845,332 B2 (Dec. 7, 2010) describes a planetary gear rotary engine for internal combustion, where a rotor rotates within an outer shell. With a given rotation of the rotor, vanes drive a power generating unit.

Rotors

Y. Ishizuka, et. al., "Sliding Vane Compressor with End Face Inserts or Rotor", U.S. Pat. No. 4,242,065 (Dec. 30, 1980) describes a sliding vane compressor having a rotor, the rotor having axially endfaces, which are juxtaposed. The axial rotor endfaces having a material of higher thermal coefficient of expansion than a material of the rotor itself, the thermal expansion of the endfaces used to set a spacing.

J. Minier, "Rotary Internal Combustion Engine", U.S. Pat. No. 6,070,565 (Jun. 6, 2000) describes an internal combustion engine apparatus containing a slotted yoke positioned for controlling the sliding of the vane blades.

Vanes

R. Jenkins, et. al., "Rotary Engine", U.S. Pat. No. 4,064,841 (Dec. 27, 1977) describes a rotary engine having a stator, an offset, a track in the rotor, and roller vanes running in the track, where each vane extends outward to separate the rotor/stator gap into chambers.

R. Roberts, et. al., "Rotary Sliding Vane Compressor with Magnetic Vane Retractor", U.S. Pat. No. 4,132,512 (Jan. 2, 1979) describes a rotary sliding vane compressor having magnetic vane retractor means to control the pumping capacity of the compressor without the use of an on/off clutch in the drive system.

D. August, "Rotary Energy-Transmitting Mechanism", U.S. Pat. No. 4,191,032 (Mar. 4, 1980) describes a rotary energy-transmitting device configure with a stator, an inner rotor and vanes separating the stator and rotor into chambers, where the vanes each pivot on a rolling ball mechanism, the ball mechanisms substantially embedded in the rotor.

J. Taylor, "Rotary Internal Combustion Engine", U.S. Pat. No. 4,515,123 (May 7, 1985) describes a rotary internal combustion engine which provides spring-loaded vanes seated opposed within a cylindrical cavity in which a rotary transfer valve rotates on a shaft.

S. Sumikawa, et al. "Sliding-vane Rotary Compressor for Automotive Air Conditioner", U.S. Pat. No. 4,580,950 (Apr. 8, 1986) describe a sliding-vane rotary compressor utilizing a control valve constructed to actuate in immediate response to a change in pressure of a fluid to be compressed able to reduce the flow of the fluid when the engine rate is high.

W. Crittenden, "Rotary Internal Combustion engine", U.S. Pat. No. 4,638,776 (Jan. 27, 1987) describes a rotary internal combustion engine utilizing a radial sliding vane on an inner surface of an eccentric circular chamber, and an arcuate transfer passage communicating between the chambers via slots in the rotors adjacent the vanes.

R. Wilks, "Rotary Piston Engine", U.S. Pat. No. 4,817,567 (Apr. 4, 1989) describes a rotary piston engine having a pear-shaped piston, with a piston vane, and four spring-loaded vanes mounted for reciprocal movement.

K. Pie, "Rotary Device with Vanes Composed of Vane Segments", U.S. Pat. No. 5,224,850 (Jul. 6, 1993) describes a rotary engine having multipart vanes between an inner rotor and an outer housing, where each vane has end parts and an intermediate part. In a first embodiment, the intermediate part and end part have cooperating inclined ramp faces, such that an outwardly directed force applied to the vane or by a biasing spring causes the end parts to thrust laterally via a wedging action. In a second embodiment, the end parts and intermediate part are separated by wedging members, located in the intermediate portion, acting on the end parts.

S. Anderson, "Gas Compressor/Expander", U.S. Pat. No. 5,379,736 (Jan. 10, 1995) describes an air compressor and gas expander having an inner rotor, an outer stator, and a set of vanes, where each vanes independently rotates, along an axis parallel to an axis of rotation of the rotor, to separate a space between the rotor and stator into chambers.

B. Mallen, et. al., "Sliding Vane Engine", U.S. Pat. No. 5,524,587 (Jun. 11, 1996) describes a sliding vane engine including: a stator and a rotor in relative rotation and vanes containing pins that extend into a pin channel for controlling sliding motion of the vanes.

J. Penn, "Radial Vane Rotary Engine", U.S. Pat. No. 5,540,199 (Jul. 30, 1996) describes a radial vane rotary engine having an inner space with a substantially constant distance between an inner cam and an outer stator, where a set of fixed length vanes separate the inner space into chambers. The inner rotating cam forces movement of each vane to contact the outer stator during each engine cycle.

L. Hedelin, "Sliding Vane Machine Having Vane Guides and Inlet Opening Regulation", U.S. Pat. No. 5,558,511 (Sep. 24, 1996) describes a sliding vane machine with a cylindrical rotor placed in a housing, the rotor being rotatably mounted in the housing at one point and being provided with a number of vanes, where movement of the vanes is guided along a guide race in the housing.

K. Kirtley, et. al., "Rotary Vane Pump With Continuous Carbon Fiber Reinforced PolyEtherEtherKetone (PEEK) Vanes", U.S. Pat. No. 6,364,646 B1 (Apr. 2, 2002) describes a rotary paddle pump with sliding vanes and a stationary side wall, where the vanes and side wall are fabricated using a continuous carbon-fiber reinforced polyetheretherketone material, having self-lubrication properties.

D. Renegar, "Flexible Vane Rotary Engine", U.S. Pat. No. 6,659,065 B1 (Dec. 9, 2003) describes an internal combustion rotary engine comprising a rotor spinning in an oval cavity and flexible vanes, defining four chambers, that bend in response to cyclical variation in distance between the rotor and an inner wall of a housing of the rotary engine.

R. Saint-Hilaire, et. al., "Quasiturbine (Qurbine) Rotor with Central Annular Support and Ventilation", U.S. Pat. No. 6,899,075 B2 (May 31, 2005) describe a quasiturbine having a rotor arrangement peripherally supported by four rolling carriages, the carriages taking the pressure load of pivoting blades forming the rotor and transferring the load to the opposite internal contoured housing wall. The pivoting blades each include wheel bearing rolling on annular tracks attached to the central area of the lateral side covers forming part of the stator casing.

T. Hamada, et al. "Sliding Structure for Automotive Engine", U.S. Pat. No. 7,255,083 (Aug. 14, 2007) describe an automotive engine having a sliding portion, such as a rotary vane, where the sliding portion has a hard carbon film formed on the base of the sliding portion.

S. MacMurray, "Single Cycle Elliptical Rotary Engine", U.S. Pat. No. 7,395,805 B1 (Jul. 8, 2008) describes a rotary engine configured a rotor housing having a bisected, offset elliptical interior wall a rotor member disposed therein. Four vanes rotate with the rotor. The rotor vanes are forced out by a pressurized oxygen/fuel mixture entering behind the vanes through ports and the vanes are pushed back into the rotor due to narrowing elliptical walls of the housing.

W. Peitzke, et. al., "Multilobe Rotary Motion Asymmetric Compression/Expansion Engine", U.S. Pat. No. 7,578,278 B2 (Aug. 25, 2009) describe a rotary engine with multiple pivotally mounted lobes desmodromically extendible and retractable from a rotor to trace asymmetric volumes for inlet and compression and for inlet and exhaust based on the contour of the engine case, which the lobes sealingly engage.

J. Rodgers, "Rotary Engine", U.S. Pat. No. 7,713,042, B1 (May 11, 2010) describes a rotary engine configured to use compressed air or high pressure steam to produce power. The engine includes a rotor having three slotted piston, opposed inlet ports running through a central valve into the slotted pistons, and a casing having two exhaust ports.

Valves

T. Larson, "Rotary Engine", U.S. Pat. No. 4,548,171 (Oct. 22, 1985) describes a rotary engine having a plurality of passages for intake, compression, expansion, and exhaust and valve means to selectively open and close the passages in a cycle of the engine.

S. Nagata, et. al., "Four Cycle Rotary Engine", U.S. Pat. No. 5,937,820 (Aug. 17, 1999) describes a rotary engine configured with an oblong casing, a circular shaped rotor therein, vanes attached to the rotor, and inlet and outlet valves. Means for manipulating the inlet and outlet valves are housed in the rotor.

Seals

H. Banasiuk, "Floating Seal System for Rotary Devices", U.S. Pat. No. 4,399,863 (Aug. 23, 1983) describes a floating seal system for rotary devices to reduce gas leakage around the rotary device. The peripheral seal bodies have a generally U-shaped cross-section with one of the legs secured to a support member and the other forms a contacting seal against the rotary device. A resilient flexible tube is positioned within a tubular channel to reduce gas leakage across the tubular channel and a spacer extends beyond the face of the floating channel to provide a desired clearance between the floating channel and the face of the rotary device.

C. David, "External Combustion Rotary Engine", U.S. Pat. No. 4,760,701 (Aug. 2, 1988) describes an external combustion rotary engine configured to operate using compressed air in internal expansion chambers. A fraction of the compressed air is further compressed and used as an air pad cushion to isolate rotating engine components from fixed position engine components.

E. Slaughter, "Hinged Valved Rotary Engine with Separate Compression and Expansion Chambers", U.S. Pat. No. 4,860,704 (Aug. 29, 1989) describes a hinge valved rotary engine where air is compressed by cooperation of a hinged compression valve that sealingly engages a compression rotor of the engine. Further, vanes expansion rotor lobe seals are forced into contact with the peripheral surface of the expansion chamber using springs.

C. Parme, "Seal Rings for the Roller on a Rotary Compressor", U.S. Pat. No. 5,116,208 (May 26, 1992) describes a sliding vane rotary pump, including: a housing, a roller mounted in the cylindrical housing, and bearing plates for closing top and bottom ends of the cylindrical opening. A seal ring is disposed within a counterbored surface of each end of the cylindrical ring, the internal space is filled with a pressurized fluid supplied by the compressor, and the pressurized fluid exerts a bias force on the seal rings causing the seal rings to move outwardly from the ends of the roller to form a seal with the bearing plates.

J. Kolhouse, "Self-Sealing Water Pump Seal", U.S. Pat. No. 5,336,047 (Aug. 9, 1994) describes a self-sealing water pump seal having a barrier after a primary seal, the barrier designed to become clogged over time with solids leaking past the primary seal, thereby forming a secondary seal.

O. Lien, "Rotary Engine Piston and Seal Assembly", U.S. Pat. No. 5,419,691 (May 30, 1995) describes a rotary engine piston and seal assembly having a cube shaped piston and a pair of grooves running around all four sliding side surfaces of the piston. the grooves contain a series of segmented metal seal compressed against mating surfaces with seal springs.

T. Stoll, et. al., "Hinged Vane Rotary Pump", U.S. Pat. No. 5,571,005 (Nov. 5, 1996) describes a hinged vane rotary pump including: a cylindrical chamber, a rotor eccentrically mounted within the chamber, and a plurality hinged vanes, where wear on the vane effectively moves to the center of the vane.

D. Andres, "Air Bearing Rotary Engine", U.S. Pat. No. 5,571,244 (Nov. 5, 1996) describes a rotary engine including vanes having tip apertures supplied with pressurized fluid to provide air bearings between the vane tip and a casing of the stator housing.

J. Klassen, "Rotary Engine and Method for Determining Engagement Surface Contours Therefor", U.S. Pat. No. 6,739,852 B1 (May 25, 2004) describes a rotary engine configured with rotor surfaces that are mirror images of engine interior contours to form a seal and recesses for interrupting the seal at predetermined points in a rotational cycle of the engine.

B. Garcia, "Rotary Internal Combustion Engine", U.S. patent application no. 2006/0102139 A1 (May 18, 2006) describes a rotary internal combustion engine having a coaxial stator, a rotor, and a transmission system, where the transmission system causes retraction movements of a first group of blades to transmit to a second group of blades forming a seal between the free edge of the blades and the inner surface of the engine.

Exhaust

W. Doerner, et. al., "Rotary Rankine Engine Powered Electric Generating Apparatus", U.S. Pat. No. 3,950,950 (Apr. 20, 1976) describe a rotary closed Rankine cycle turbine engine powered electric generating apparatus having a single condenser and/or a primary and secondary condenser for condensing exhaust vapors.

D. Aden, et. al., "Sliding Vane Pump", U.S. Pat. No. 6,497,557 B2 (Dec. 24, 2002) describes a sliding vane pump having a plurality of inlet ports, internal discharge ports, and at least two discharge ports where all of the fluid from one of the internal discharge ports exits through one of the external discharge ports.

J. Klassen, "Method for Determining Engagement Surface Contours for a Rotor of an Engine", U.S. Pat. No. 6,634,873 B2 (Oct. 21, 2003) describes a rotary engine configured with rotor surfaces that are mirror images of engine interior contours to form a seal and recesses for interrupting the seal at predetermined points in a rotational cycle of the engine.

D. Patterson, et. al., "Combustion and Exhaust Heads for Fluid Turbine Engines", U.S. Pat. No. 6,799,549 B1 (Oct. 5, 2004) describes an internal combustion rotary turbine engine including controls for opening and closing an exhaust valve during engine operation.

R. Gorski, "Gorski Rotary Engine", U.S. Pat. No. 7,073,477 B2 (Jul. 11, 2006) describes a rotary engine configured with solid vanes extending from a rotor to an interior wall of the stator housing. A series of grooves in the interior wall permit the expanding exhaust gases to by-pass the vanes proximate the combustion chamber to engage the larger surface area of the vane protruding from the rotor.

H. Maeng, "Sliding Vane of Rotors", U.S. Pat. No. 7,674,101 B2 (Mar. 9, 2010) describes a sliding vane extending through a rotor in diametrically opposed directions and rotating with the rotor. Diametrically opposed ends of the sliding vane include sealing slots. The sliding vane further includes two pairs of compression plates provided in plate sealing slots for sealing the edges of the vane, the compression plates activated using springs in the vane.

E. Carnahan, "External Heat Engine of the Rotary Vane Type and Compressor/Expander", U.S. patent application no. US 2008/0041056 A1 (Feb. 21, 2008) describes a rotary engine using injected cool liquid into a compression section of the engine.

Cooling

T. Maruyama, et al. "Rotary Vane Compressor With Suction Port Adjustment", U.S. Pat. No. 4,486,158 (Dec. 4, 1984) describe a sliding vane type rotary compressor with suction port adjustment, of which refrigerating capacity at the high speed operation is suppressed by making use of suction loss involved when refrigerant pressure in the vane chamber becomes lower than the pressure of the refrigerant supply source in the suction stroke of the compressor.

R. Ullyott, "Internal Cooling System for Rotary Engine", U.S. Pat. No. 7,412,831 B2 (Aug. 19, 2008) describes a rotary combustion engine with self-cooling system, where the cooling system includes: a heat exchanging interface and a drive fan integrated on an output shaft of the rotary engine, the fan providing a flow of forced air over the heat exchanging interface.

Varying Loads

T. Alund, "Sliding Vane Machines", U.S. Pat. No. 4,046,493 (Sep. 6, 1977) describes a sliding vane machine using a valve and pressure plates to control the working area of valves in the sliding vane machine.

Jet

A. Schlote, "Rotary Heat Engine", U.S. Pat. No. 5,408,824 (Apr. 25, 1995) describes a jet-propelled rotary engine having a rotor rotating about an axis and at least one jet assembly secured to the rotor and adapted for combustion of a pressurized oxygen-fuel mixture.

Problem

What is needed is an external combustion rotary heat engine that more efficiently converts the about adiabatic expansive energy of the fuel driving the engine into rotational power and/or energy for use driving a variety of applications.

SUMMARY OF THE INVENTION

The invention comprises a rotary chamber device method and apparatus using an offset rotor, a housing cutout, and/or a housing build-up.

BRIEF DESCRIPTION OF THE DRAWINGS

A more complete understanding of the present invention is derived by referring to the detailed description and claims when considered in connection with the Figures, wherein like reference numbers refer to similar items throughout the Figures.

DETAILED DESCRIPTION OF THE PREFERRED EMBODIMENTS

Figure 1:
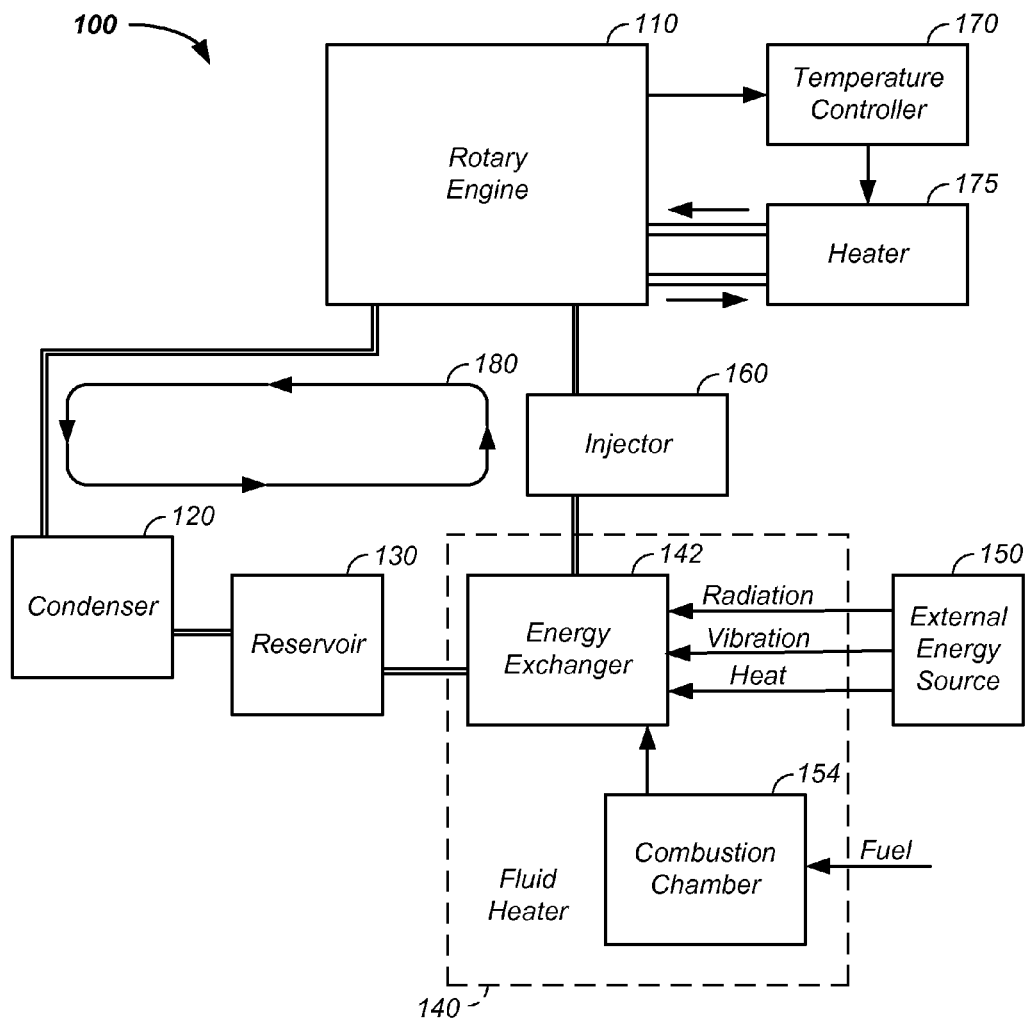
FIG. 1 illustrates a rotary engine system.

The invention comprises a rotary engine method and apparatus using an offset rotor. The rotary engine is preferably a component of an engine system using a recirculating liquid/vapor.

In one embodiment, an engine is described for operation on a fuel expanding about adiabatically in a power stroke of the engine. To aid the power stroke efficiency, the rotary engine contains one or more of a rotor configured to rotate in a stator, the rotor offset along both an x-axis and a y-axis relative to a center of the stator, a vane configured to span a distance between the rotor and the stator, where the inner wall of the stator further comprises at least one of: a first cut-out in the housing at the initiation of the power stroke, use of a build-up in the housing at the end of the power stroke, and/or use of a second cut-out in the housing at the completion of rotation of the rotor in the engine. The engine yields a cross-sectional area expanding during a portion of the power stroke at about the Fibonacci ratio.

For example, a rotary engine is provided for operation on a recirculating fuel expanding about adiabatically during a power cycle or power stroke of the rotary engine. To aid the power stroke efficiency, the rotary engine preferably contains one or more of:

a double offset rotor geometry relative to a housing or a stator, such as an eccentrically positioned rotor relative to the housing, where the eccentrically positioned rotor is additionally offset so that the rotor is offset from the housing center along both the x-axis and y-axis;

use of a first cut-out in the engine housing at the initiation of the power stroke;

use of a build-up in the housing at the end of the power stroke; and/or use of a second cut-out in the housing at the completion of rotation of the rotor in the engine.

The first-cut out allows an increased distance between the stator and the rotor, which yields an increased cross-sectional area of the expansion chamber, which yields increased power of the engine. The build-up allows an increased x-axis and y-axis offset of the double offset rotor relative to the center of the stator. More particularly, the vane reaches full extension before the six o'clock position to optimize power and without the build up at the six o'clock position the vane overextends potentially causing unit failure. The second cut-out allows room for a vane, having a vane tip or a vane wingtip not fully retractable into the rotor, to pass between the rotor and the stator at about the eleven o'clock position without restraint of movement.

Further, fuels described maintain about adiabatic expansion to a high ratio of gas/liquid when maintained at a relatively constant temperature via use of a temperature controller for the expansion chambers. Expansive forces of the fuel acting on the rotor are aided by hydraulic forces, vortical forces, an about Fibonacci-ratio increase in volume in an expansion chamber during the power cycle or power stroke, sliding vanes, and/or swinging vanes between the rotor and housing. Herein, a power stroke refers to the stroke of a cyclic motor or engine which generates force.

Rotary Engine

Herein, rotary engine examples are used to explain the engine system 100 elements. However, the engine system 100 elements additionally apply in-part and/or in-whole to expander engines, heat engines, pumps, and/or compressors.

A rotary engine system uses power from an expansive force, such as from an internal or external combustion process, to produce an output energy, such as a rotational or electric force.

Referring now to FIG. 1, a rotary engine 110 is preferably a component of an engine system 100. In the engine system 100, gas/liquid in various states or phases are optionally re-circulated in a circulation system 180, illustrated figuratively. In the illustrated example, gas output from the rotary engine 110 is transferred to and/or through a condenser 120 to form a liquid; then through an optional reservoir 130 to a fluid heater 140 where the liquid is heated to a temperature and pressure sufficient to result in state change of the liquid to gas form when passed through an injector 160 and back into the rotary engine 110. In one case, the fluid heater 140 optionally uses an external energy source 150, such as radiation, vibration, and/or heat to heat the circulating fluid in an energy exchanger 142. In a second case, the fluid heater 140 optionally uses fuel in an external combustion chamber 154 to heat the circulating fluid in the energy exchanger 142. The rotary engine 110, is further described infra.

Still referring to FIG. 1, maintenance of the rotary engine 110 at a set operating temperature enhances precision and/or efficiency of operation of the engine system 100. Hence, the rotary engine 110 is optionally coupled to a temperature controller 170 and/or a block heater 175. Preferably, the temperature controller senses with one or more sensors the temperature of the rotary engine 110 and controls a heat exchange element attached and/or indirectly attached to the rotary engine, which maintains the rotary engine 110 at about the set point operational temperature. In a first scenario, the block heater 174 heats expansion chambers, described infra, to a desired operating temperature. The block heater 175 is optionally configured to extract excess heat from the fluid heater 140 to heat one or more elements of the rotary engine 110, such as the rotor 320, double offset rotor 440, vanes, an inner wall of the housing, an inner wall of the first end plate 212, and/or an inner wall of the first or second end plate 214.

Figure 2:
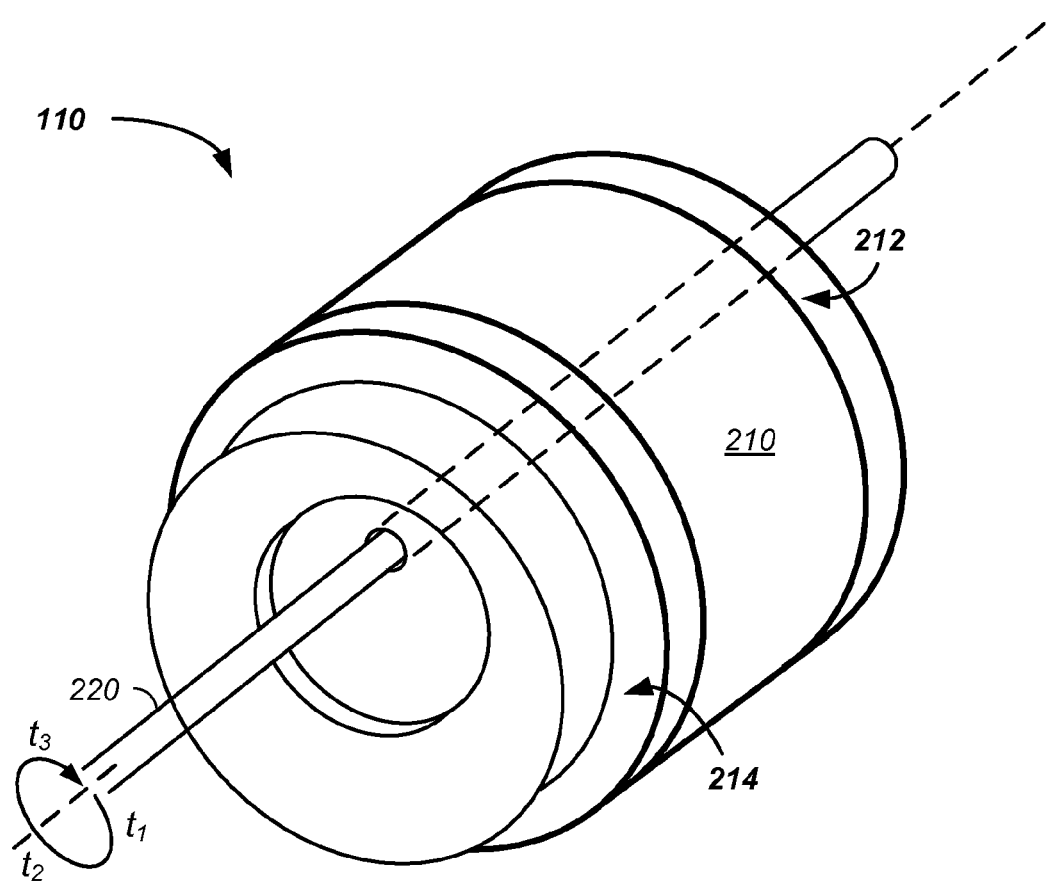
FIG. 2 illustrates a rotary engine housing.

Referring now to FIG. 2, the rotary engine 110 includes a housing 210 on an outer side of a series of expansion chambers, a first end plate 212 affixed to a first side of the housing, and a second end plate 214 affixed to a second side of the housing. Combined, the housing 210, first end plate 212, second end plate 214, and a rotor, described infra, contain a series of expansion chambers in the rotary engine 110. An offset shaft preferably runs into and/or runs through the first end plate 212, inside the housing 210, and into and/or through the second end plate 214. The offset shaft 220 is centered to the rotor 320 or double offset rotor 440 and is offset relative to the center of the rotary engine 110.

Rotors

Rotors of various configurations are used in the rotary engine 110. The rotor 320 is optionally offset in the x- and/or y-axes relative to a z-axis running along the length of the shaft 220. A rotor 320 offset in the x-axis or y-axis relative to a z-axis running along the length of the shaft 220 is referred to herein as a double offset rotor 440. The shaft 220 is optionally double walled. The rotor chamber face 442, also referred to as an outer edge of the rotor, or the rotor outer wall, of the double offset rotor 440 forming an inner wall of the expansion chambers is of varying geometry. Examples of rotor configurations in terms of offsets and shapes are further described, infra. The examples are illustrative in nature and each element is optional and may be used in various permutations and/or combinations.

Vanes

A vane or blade separates two chambers of a rotary engine. The vane optionally functions as a seal and/or valve. The vane itself optionally acts as a propeller, impeller, and/or an electromagnetic generator element.

Engines are illustratively represented herein with clock positions, with twelve o'clock being a top of an x-, y-plane cross-sectional view of the engine with the z-axis running along the length of the shaft of the engine. The twelve o'clock position is alternatively referred to as a zero degree position. Similarly twelve o'clock to three o'clock is alternatively referred to as zero degrees to ninety degrees and a full rotation around the clock covers three hundred sixty degrees. Those skilled in the art will immediately understand that any multi-axes illustration system is alternatively used and that rotating engine elements in this coordination system alters only the description of the elements without altering the function of the elements.

Figure 3:
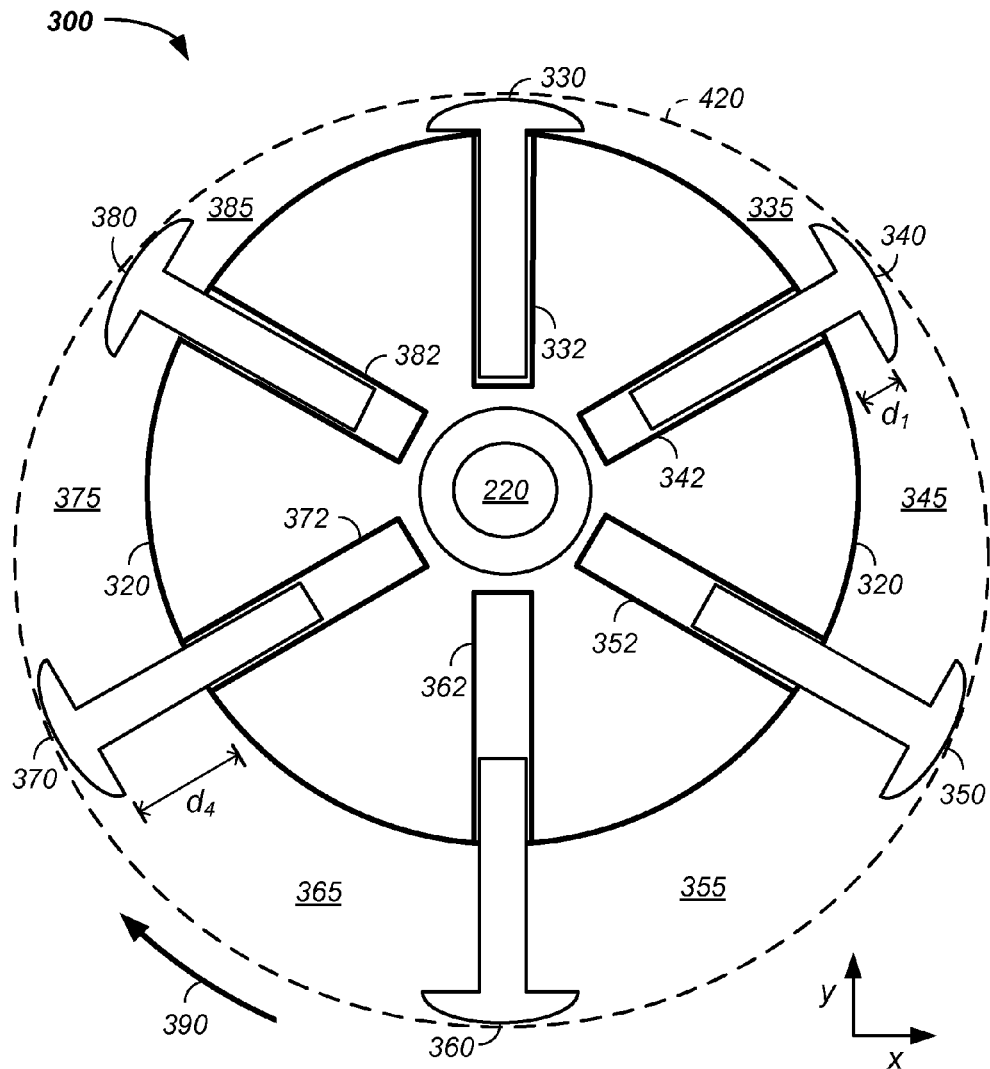
FIG. 3 illustrates a sectional view of a single offset rotary engine.

Referring now to FIG. 3, vanes relative to an inner wall 420 of the housing 210 and relative to a rotor 320 are described. As illustrated, a z-axis runs through the length of the shaft 220 and the rotor rotates around the z-axis. A plane defined by x- and y-axes is perpendicular to the z-axis. Vanes extend between the rotor 320 and the inner wall 420 of the housing 210. As illustrated, the single offset rotor system 300 includes six vanes, with: a first vane 330 at a twelve o'clock position, a second vane 340 at a two o'clock position, a third vane 350 at a four o'clock position, a fourth vane 360 at a six o'clock position, a fifth vane 370 at a ten o'clock position, and a sixth vane 380 at a ten o'clock position. Any number of vanes are optionally used, such as about 2, 3, 4, 5, 6, 8, or more vanes. Preferably, an even number of vanes are used in the rotor system 300.

Still referring to FIG. 3, the vanes extend outward from the rotor 320 through vane slots. As illustrated, the first vane 330 extends from a first vane slot 332, the second vane 340 extends from a second vane slot 342, the third vane 350 extends from a third vane slot 352, the fourth vane 360 extends from a fourth vane slot 362, the fifth vane 370 extends from a fifth vane slot 372, and the sixth vane 380 extends from a sixth vane slot 382. Each of the vanes are slidingly coupled and/or hingedly coupled to the rotor 320 and the rotor 320 is fixedly coupled to the shaft 220. When the rotary engine is in operation, the rotor 320, vanes, and vane slots rotate about the shaft 220. Hence, the first vane 330 rotates from the twelve o'clock position sequentially through each of the 2, 4, 6, 8, and 10 o'clock positions and ends up back at the twelve o'clock position. When the rotary engine 210 is in operation, pressure upon the vanes causes the rotor 320 to rotate relative to the non-rotating inner wall of the housing 420, which causes rotation of shaft 220. As the rotor 210 rotates, each vane slides outward to maintain proximate contact or sealing contact with the inner wall of the housing 420.

Still referring to FIG. 3, expansion chambers or sealed expansion chambers relative to an inner wall 420 of the housing 210, vanes, and rotor 320 are described. As illustrated, the rotary system is configured with six expansion chambers. Each of the expansion chambers reside in the rotary engine 210 along the z-axis between the first end plate 212 and second end plate 214. Further, each of the expansion chambers resides between the rotor 320 and inner wall of the housing 420. Still further, the expansion chambers are contained between the vanes. As illustrated, a first expansion chamber 335 is in a first volume between the first vane 330 and the second vane 340, a second expansion chamber 345 is in a second volume between the second vane 340 and the third vane 350, a third expansion chamber 355 is in a third volume between the third vane 350 and the fourth vane 360, a fourth expansion chamber or first reduction chamber 365 is in a fourth volume between the fourth vane 360 and the fifth vane 370, a fifth expansion chamber or second reduction chamber 375 is in a fifth volume between the fifth vane 370 and the sixth vane 380, and a sixth expansion chamber or third reduction chamber 385 is in a sixth volume between the sixth vane 380 and the first vane 330. The first, second, and third reduction chambers 365, 375, 385 are optionally compression or exhaust chambers. As illustrated, the volume of the second expansion chamber 345 is greater than the volume of the first expansion chamber and the volume of the third expansion chamber is greater than the volume of the second expansion chamber. The increasing volume of the expansion chambers in the first half of a rotation of the rotor 320 about the shaft 220 results in greater efficiency, power, and/or torque, as described infra.

Single Offset Rotor

Still referring to FIG. 3, a single offset rotor is illustrated. The housing 210 has a center position in terms of the x-, y, and z-axis system. In a single offset rotor system, the shaft 220 running along the z-axis is offset along one of the x- or y-axes. For clarity of presentation, expansion chambers are referred to herein as residing in static positions and having static volumes, though they rotate about the shaft and change in both volume and position with rotation of the rotor 320 about the shaft 220. As illustrated, the shaft 220 is offset along the y-axis, though the offset could be along any x-, y-vector. Without the offset along the y-axis, each of the expansion chambers is uniform in volume. With the offset, the second expansion chamber 345, at the position illustrated, has a volume greater than the first expansion chamber and the third expansion chamber has a volume greater than that of the second expansion chamber. The fuel mixture from the fluid heater 140 or vapor generator is injected via the injector 160 into the first expansion chamber 335. As the rotor rotates, the volume of the expansion chambers increases, as illustrated in the static position of the second expansion chamber 345 and third expansion chamber 355. The increasing volume allows an expansion of the fuel, such as a gas, vapor, and/or plasma, which preferably occurs about adiabatically. The expansion of the fuel releases energy that is forced against the vane and/or vanes, which results in rotation of the rotor. The increasing volume of a given expansion chamber through the first half of a rotation of the rotor 320, such as in the power stroke described infra, about the shaft 220 combined with the extension of the vane from the rotor shaft to the inner wall of the housing results in a greater surface area for the expanding gas to exert force against resulting in rotation of the rotor 320. The increasing surface area to push against in the first half of the rotation increases efficiency of the rotary engine 110. For reference, relative to double offset rotary engines and rotary engines including build-ups and cutouts, described infra, the single offset rotary engine has a first distance, $d_1$, at the two o'clock position and a fourth distance, $d_4$, between the rotor 320 and inner wall of the housing 430 at the eight o'clock position.

Double Offset Rotor

Figure 4:
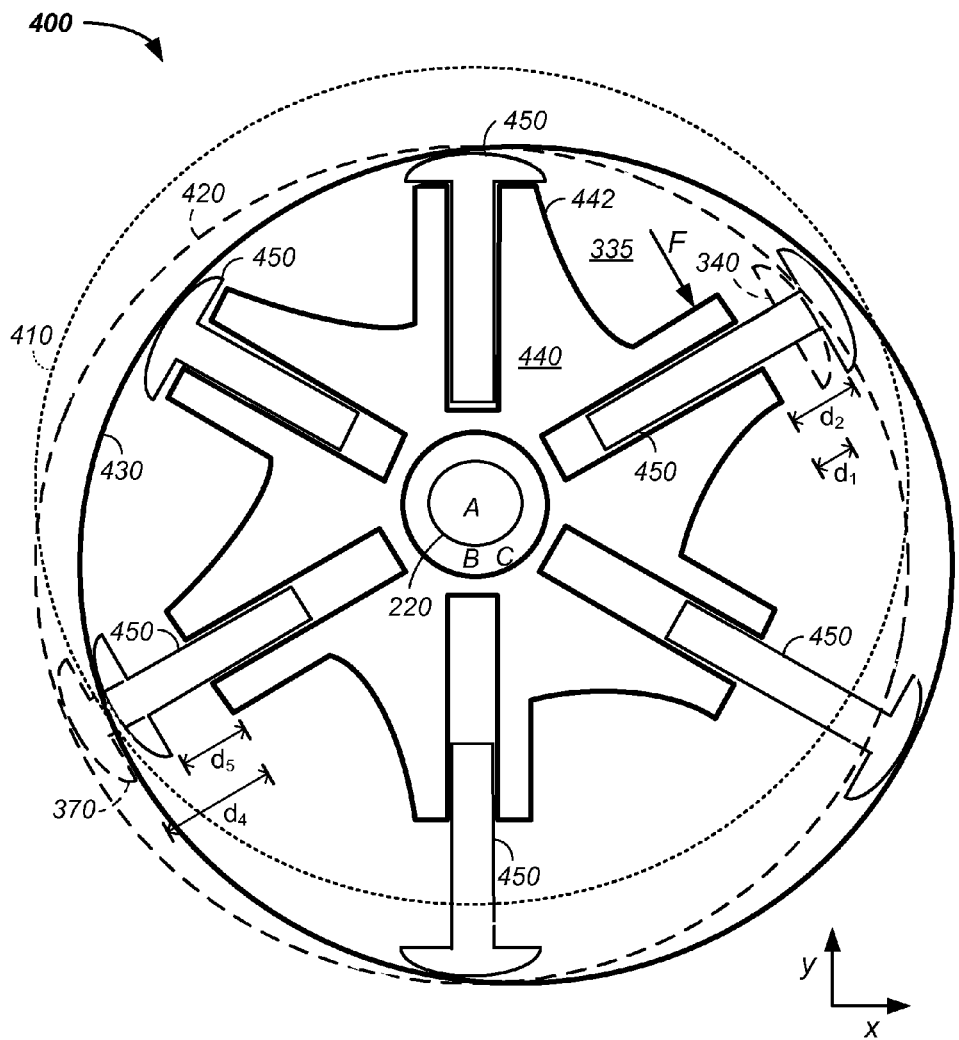
FIG. 4 illustrates a sectional view of a double offset rotary engine.

Referring now to FIG. 4, a double offset rotor engine 400 is illustrated. To demonstrate the offset of the housing, three housing 210 positions are illustrated. The double offset rotor 440 and vanes 450 are illustrated only for the double offset housing position 430. In the first zero offset position, the first housing position 410 is denoted by a dotted line and the housing 210 is equidistant from the double offset rotor 440 in the x-, y-plane. Stated again, in the first housing position, the double offset rotor 440 is centered relative to the first housing position 410 about point 'A'. The centered first housing position 410 is non-functional. The single offset rotor position was described, supra, and illustrated in FIG. 3. The single offset housing position 420 is repeated and still illustrated as a dashed line in FIG. 4. The housing second position is a single offset housing position 420 centered at point 'B', which has an offset in only the y-axis versus the zero offset housing position 410. A third preferred housing position is a double offset rotor position 430 centered at position 'C'. The double offset housing position 430 is offset in both the x- and y-axes versus the zero offset housing position. The offset of the housing 430 relative to the double offset rotor 440 in two axes results in efficiency gains of the double offset rotor engine, as described supra.

Still referring to FIG. 4, the extended two o'clock vane position 340 for the single offset rotor illustrated in FIG. 3 is re-illustrated in the same position in FIG. 4 as a dashed line with distance, $d_1$, between the vane wing tip and the outer edge of the double offset rotor 440. It is observed that the extended two o'clock vane position 450 for the double offset rotor has a longer distance, $d_2$, between the vane wing tip and the outer edge of the double offset rotor 440 compared with the extended position vane in the single offset rotor. The larger extension, $d_2$, yields a larger cross-sectional area for the expansive forces in the first expansion chamber 335 to act on, thereby resulting in larger forces, such as turning forces or rotational forces, from the expanding gas pushing on the double offset rotor 440. Note that the illustrated double offset rotor 440 in FIG. 4 is illustrated with the rotor chamber face 442 having a curved surface running from near a wing tip toward the shaft in the expansion chamber to increase expansion chamber volume and to allow a greater surface area for the expanding gases to operate on with a force vector, F. The curved surface is of any specified geometry to set the volume of the expansion chamber 335. Similar force and/or power gains are observed from the twelve o'clock to six o'clock position using the double offset rotor engine 400 compared to the single offset rotor engine 300.

Still referring to FIG. 4, The fully extended eight o'clock vane 370 of the single offset rotor is re-illustrated in the same position in FIG. 4 as a dashed image with distance, $d_4$, between the vane wing tip and the outer edge of the double offset rotor 440. It is noted that the double offset housing 430 forces full extension of the vane to a smaller distance, $d_5$, between the vane wing tip and the outer edge of the double offset rotor 440. However, rotational forces are not lost with the decrease in vane extension at the eight o'clock position as the expansive forces of the gas fuel are expended by the six o'clock position and the gases are vented before the eight o'clock position, as described supra. The detailed eight o'clock position is exemplary of the six o'clock to twelve o'clock positions.

The net effect of using a double offset rotor engine 400 is increased efficiency and power in the power stroke, such as from the twelve o'clock to six o'clock position or through about 180 degrees, using the double offset rotor engine 400 compared to the single offset rotor engine 300 without loss of efficiency or power from the six o'clock to twelve o'clock positions.

Cutouts, Build-ups, and Vane Extension

FIGS. 3 and 4 illustrate inner walls of housings 410, 420, and 430 that are circular. However, an added power and/or efficiency advantage results from cutouts and/or buildups in the inner surface of the housing. For example, an x-, y-axes cross-section of the inner wall shape of the housing 210 is optionally non-circular, elliptical, oval, egg shaped, cutout relative to a circle, and/or built up relative to a circle.

Figure 5:
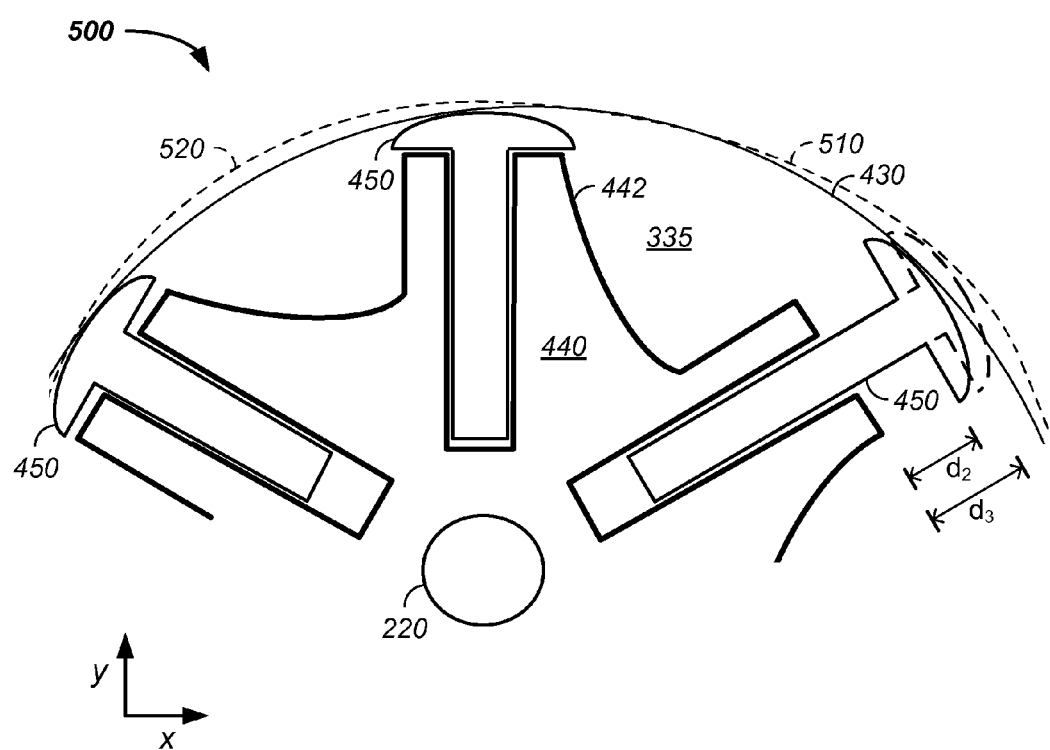
FIG. 5 illustrates housing cut-outs.

Referring now to FIG. 5 and still referring to FIG. 4, optional cutouts in the housing 210 are described. A cutout is readily understood as a removal of material from a elliptical inner wall of the housing; however, the material is not necessarily removed by machining the inner wall, but rather is optionally cast or formed in final form or is defined by the shape of an insert piece that fits along the inner wall 420 of the housing. For clarity, cutouts are described relative to the inner wall of the double offset rotor housing 430; however, cutouts are optionally used with any housing 210. The optional cutouts and build-ups described herein are optionally used independently or in combination.

Still referring to FIG. 5, a first optional cutout is illustrated at about the one o'clock to three o'clock position of the housing 430. To further clarify, a cut-out, which is optionally referred to as a vane extension limiter beyond a nominal distance to the housing 430, is optionally: (1) a machined away portion of an otherwise inner wall of the circular housing 430; (2) an inner wall housing 430 section having a greater radius from the center of the shaft 220 to the inner wall of the housing 430 compared with a non-cutout section of the inner wall housing 430; (3) is a section molded, cast, and/or machined to have a further distance for the vane 450 to slide to reach the housing compared to a nominal circular housing; or (4) is a removable housing insert circumferentially bordering the inner wall housing 430 about the rotor, where the housing insert includes an increased distance from the center of the rotor within the cut-out at the one o'clock to three o'clock position. For clarity, only the ten o'clock to two o'clock position of the double offset rotor engine 400 is illustrated. The first cutout 510 in the housing 430 is present in about the twelve o'clock to three o'clock position and preferably at about the two o'clock position. Generally, the first cutout allows a longer vane 450 extension at the cutout position compared to a circular or an elliptical x-, y-cross-section of the housing 430. To illustrate, still referring to FIG. 5, the extended two o'clock vane position 340 for the double offset rotor illustrated in FIG. 4 is re-illustrated in the same position in FIG. 5 as a solid line image with distance, $d_2$, between the vane wing tip and the outer edge of the double offset rotor 440. It is observed that the extended two o'clock vane position 450 for the double offset rotor having cutout 510 has a longer distance, $d_3$, between the vane wing tip and the outer edge of the double offset rotor 440 compared with the extended position vane in the double offset rotor. The larger extension, $d_3$, yields a larger cross-sectional area for the expansive forces in the first expansion chamber 335 to act on, thereby resulting in larger turning forces from the expanding gas pushing on the double offset rotor 440. To summarize, the vane extension distance, $d_1$, using a single offset rotor engine 300 is less than the vane extension distance, $d_2$, using a double offset rotor engine 400, which is less than vane extension distance, $d_3$, using a double offset rotor engine with a first cutout as is observed in equation 1.

$$d_1 < d_2 < d_3 \qquad \text{(eq. 1)}$$

Still referring to FIG. 5, a second optional cutout 520 is illustrated at about the eleven o'clock position of the housing 430. The second cutout 520 is present at about the ten o'clock to twelve o'clock position and preferably at about the eleven o'clock to twelve o'clock position. Generally, the second cutout allows a vane having a wingtip, described supra, to physically fit between the double offset rotor 440 and housing 430 in a double offset rotor engine 500. The second cutout 520 also adds to the magnitude of the offset possible in the single offset engine 300 and in the double offset engine 400, which increases distances $d_2$ and $d_3$.

Figure 6:
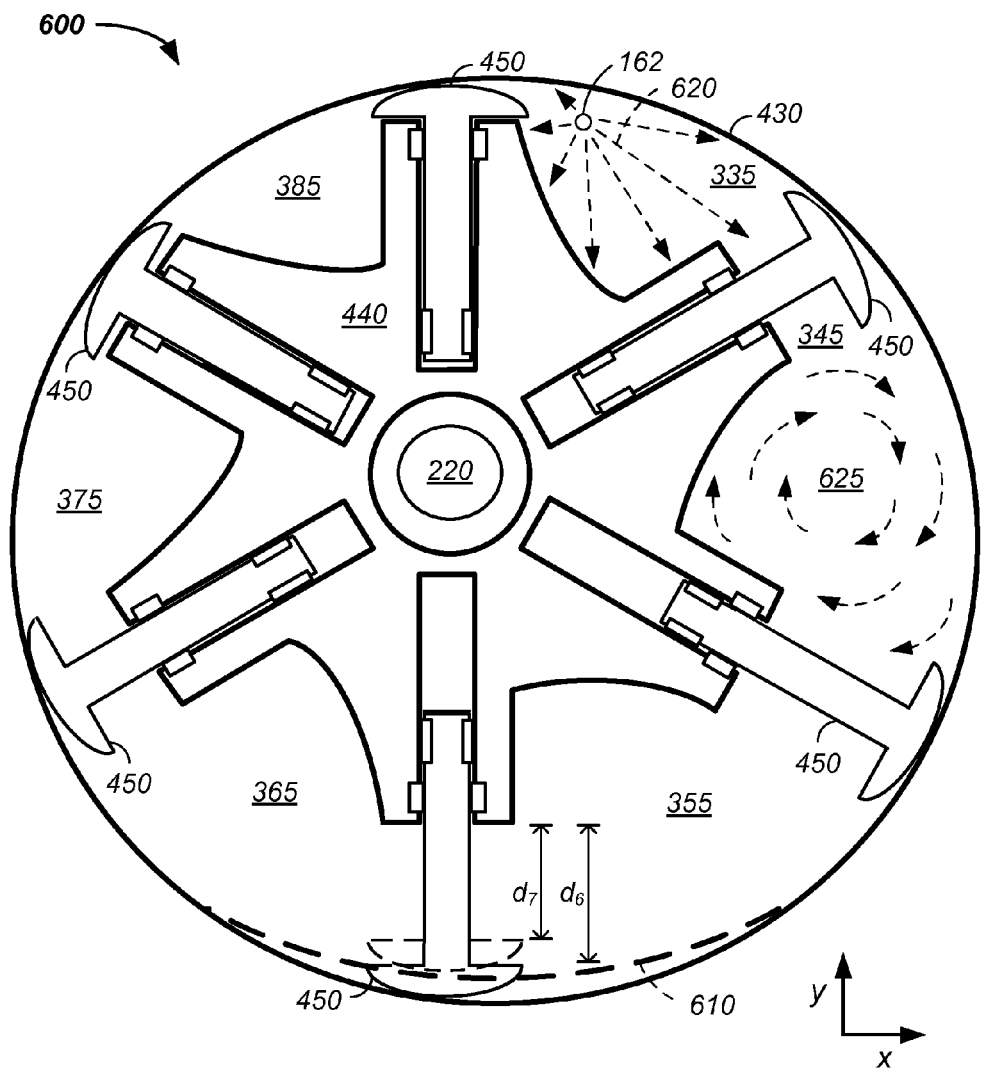
FIG. 6 illustrates a housing build-up.

Referring now to FIG. 6, an optional build-up 610 on the interior wall of the housing 430 is illustrated from an about five o'clock to about seven o'clock position of the engine rotation. The build-up 610 allows a greater offset of the double offset rotor 440 up along the y-axis. Without the build-up, a smaller y-axis offset of the double offset rotor 440 relative to the housing 430 is needed as the vane 450 at the six o'clock position would not reach, without possible damae due to overextension of the vane, the inner wall of the housing 430 without the build-up 610. As illustrated, the build-up 610 reduces the vane extension distance required for the vane 450 to reach from the double offset rotor 440 to the housing 430 from a sixth distance, $d_6$, from an elliptical housing to a seventh distance, $d_7$ of the built-up housing 610. As described, supra, the greater offset in the x- and y-axes of the double offset rotor 440 relative to the housing 430 yields great rotor engine 110 output power and/or efficiency by increasing the volume of the first expansion chamber 335, second expansion chamber 345, and/or third expansion chamber 355.

Method of Operation

For the purposes of this discussion, any of the single offset-rotor engine 300, double offset rotor engine 400, rotor engine having a cutout 500, rotor engine having a build-up 600, or a rotor engine having one or more elements described herein is applicable to use as the rotary engine 110 used in this example. Further, any housing 210, rotor 320, and vane 450 dividing the rotary engine 210 into expansion chambers is optionally used as in this example. For clarity, a reference expansion chamber is used to describe a current position of the expansion chambers. For example, the reference chamber rotates in a single rotation from the twelve o'clock position and sequentially through the one o'clock position, three o'clock position, five o'clock position, seven o'clock position, nine o'clock position, and eleven o'clock position before returning to the twelve o'clock position. The reference expansion chamber is alternatively referred to as a compression chamber from six o'clock to the twelve o'clock position.

Figure 7:
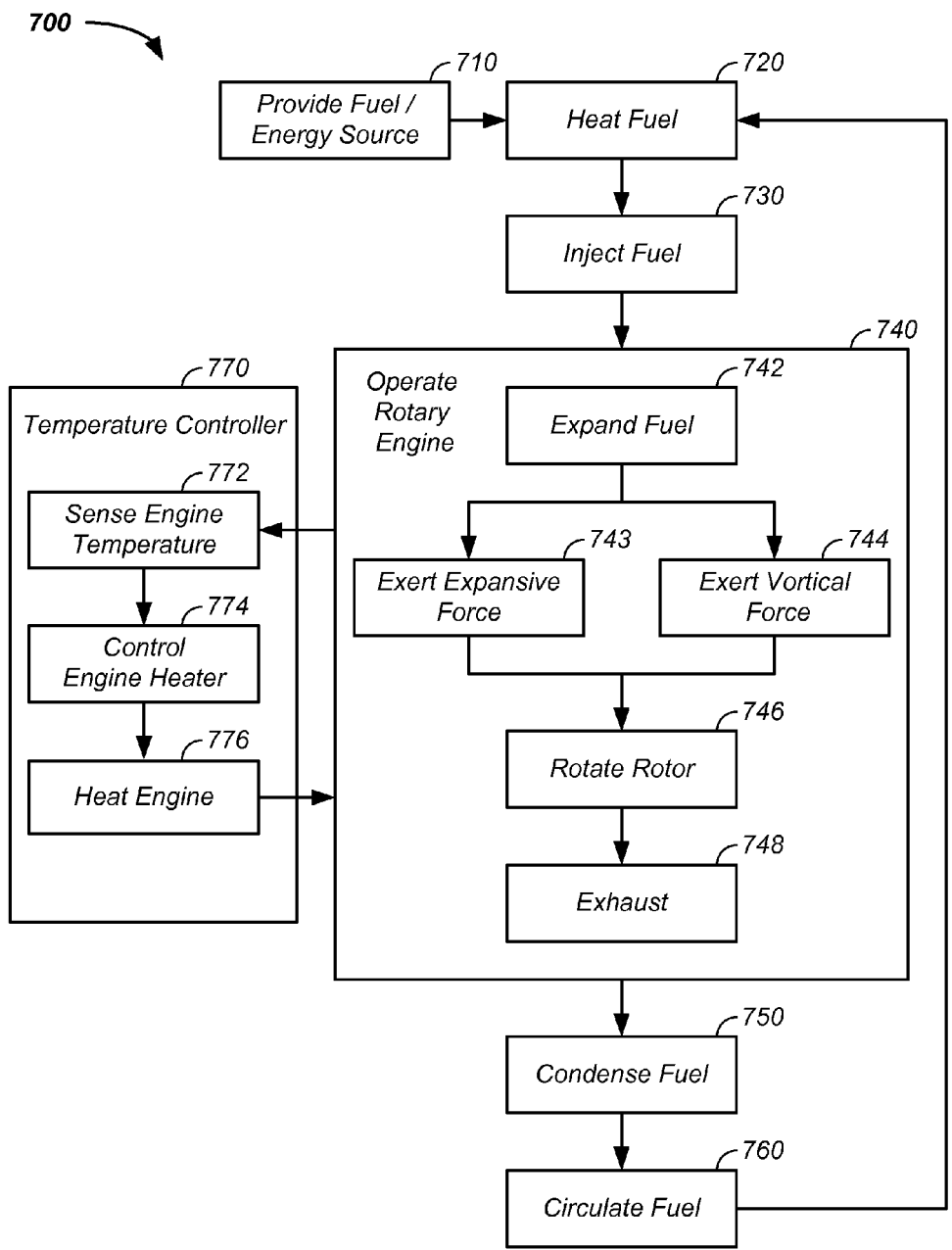
FIG. 7 provides a method of use of the rotary engine system.

Referring now to FIG. 7, a flow chart of a process 700 for the operation of rotor engine system 100 in accordance a preferred embodiment is described. Process 700 describes the operation of rotary engine 110.

Initially, a fuel and/or energy source is provided 710. The fuel is optionally from the external energy source 150. The energy source 150 is a source of: radiation, such as solar; vibration, such as an acoustical energy; and/or heat, such as convection. Optionally the fuel is from an external combustion chamber 154.

Throughout operation process 700, a first parent task circulates the fuel 760 through a closed loop or an open loop.

The closed loop cycles sequentially through: heating the fuel 720; injecting the fuel 730 into the rotary engine 110; expanding the fuel 742 in the reference expansion chamber; one or both of exerting an expansive force 743 on the double offset rotor 440 and exerting a vortical force 744 on the double offset rotor 440; rotating the rotor 746 to drive an external process, described infra; exhausting the fuel 748; condensing the fuel 750, and repeating the process of circulating the fuel 760. Preferably, the external energy source 150 provides the energy necessary in the heating the fuel step 720. Individual steps in the operation process are further described, infra.

Throughout the operation process 700, an optional second parent task maintains temperature 770 of at least one rotor engine 110 component. For example, a sensor senses engine temperature 772 and provides the temperature input to a controller of engine temperature 774. The controller directs or controls a heater 776 to heat the engine component. Preferably, the temperature controller 770 heats at least the first expansion chamber 335 to an operating temperature in excess of the vapor-point temperature of the fuel. Preferably, at least the first three expansion chambers 335, 345, 355 are maintained at an operating temperature exceeding the vapor-point of the fuel throughout operation of the rotary engine system 100. Preferably, the fluid heater 140 is simultaneously heating the fuel to a temperature proximate but less than the vapor-point temperature of fluid. Hence, when the fuel is injected through the injector 160 into the first expansion chamber 335, the fuel flash vaporizes exerting expansive force 743 and starts to rotate due to reference chamber geometry and rotation of the rotor to form the vortical force 744.

The fuel is optionally any fuel that expands into a vapor, gas, and/or gas-vapor mix where the expansion of the fuel releases energy used to drive the double offset rotor 440. The fuel is preferably a liquid component and/or a fluid that phase changes to a vapor phase at a very low temperature and has a significant vapor expansion characteristic. Fuels and energy sources are further described, infra.

In task 720, the fluid heater 140 preferably superheats the fuel to a temperature greater than or equal to a vapor-point temperature of the fuel. For example, if a plasmatic fluid is used as the fuel, the fluid heater 140 heats the plasmatic fluid to a temperature greater than or equal to a vapor-point temperature of plasmatic fluid.

In a task 730, the injector 160 injects the heated fuel, via an inlet port 162, into the reference cell, which is the first expansion chamber 335 at time of fuel injection into the rotary engine 110. When the fuel is superheated, the fuel flash-vaporizes and expands 742, which exerts one of more forces on the double offset rotor 440. A first force is an expansive force 743 resultant from the phase change of the fuel from predominantly a liquid phase to substantially a vapor and/or gas phase. The expansive force acts on the double offset rotor 440 as described, supra, and is represented by force, F, in FIG. 4 and is illustratively represented as expansive force vectors 620 in FIG. 6. A second force is a vortical force 744 exerted on the double offset rotor 440. The vortical force 744 is resultant of geometry of the reference cell, which causes a vortex or rotational movement of the fuel in the chamber based on the geometry of the injection port, rotor chamber face 442 of the double offset rotor 440, inner wall of the housing 210, first end plate 212, second end plate 214, and the extended vane 450 and is illustratively represented as vortex force vectors 625 in FIG. 6. A third force is a hydraulic force of the fuel pushing against the leading vane as the inlet preferably forces the fuel into the leading vane upon injection of the fuel 730. The hydraulic force exists early in the power stroke before the fluid is flash-vaporized. All of the hydraulic force, the expansive force vectors 620, and vortex force vectors 625 optionally simultaneously exist in the reference cell, in the first expansion chamber 335, second expansion chamber 345, and third expansion chamber 355.

When the fuel is introduced into the reference cell of the rotary engine 110, the fuel begins to expand hydraulically and/or about adiabatically in a task 740. The expansion in the reference cell begins the power stroke or power cycle of engine, described infra. In a task 746, the hydraulic and about adiabatic expansion of fuel exerts the expansive force 743 upon a leading vane 450 or upon the surface of the vane 450 proximate or bordering the reference cell in the direction of rotation 390 of the double offset rotor 440. Simultaneously, in a task 744, a vortex generator, generates a vortex 625 within the reference cell, which exerts a vortical force 744 upon the leading vane 450. The vortical force 744 adds to the expansive force 743 and contributes to rotation 390 of rotor 450 and shaft 220. Alternatively, either the expansive force 743 or vortical force 744 causes the leading vane 450 to move in the direction of rotation 390 and results in rotation of the rotor 746 and shaft 220. Examples of a vortex generator include: an aerodynamic fin, a vapor booster, a vane wingtip, expansion chamber geometry, valving, inlet port 162 orientation, an exhaust port booster, and/or power shaft injector inlet.

The about adiabatic expansion resulting in the expansive force 743 and the generation of a vortex resulting in the vortical force 744 continue throughout the power cycle of the rotary engine, which is nominally complete at about the six o'clock position of the reference cell. Thereafter, the reference cell decreases in volume, as in the first reduction chamber 365, second reduction chamber 375, and third reduction chamber 385. In a task 748, the fuel is exhausted or released 748 from the reference cell, such as through exhaust grooves cut through the housing 210, first end plate 212, and/or second end plate 214 at or about the six o'clock to eight o'clock position. The exhausted fuel is optionally discarded in a non-circulating system. Preferably, the exhausted fuel is condensed 750 to liquid form in the condenser 120, optionally stored in the reservoir 130, and recirculated 760, as described supra.

Fuel

As described, supra, fuel is optionally any liquid or liquid/solid mixture that expands into a vapor, vapor-solid, gas, gas-solid, gas-vapor, gas-liquid, gas-vapor-solid mix where the expansion of the fuel releases energy used to drive the double offset rotor 440. The fuel is preferably substantially a liquid component and/or a fluid that phase changes to a vapor phase at a very low temperature and has a significant vapor expansion characteristic. Additives into the fuel and/or mixtures of fuels include any permutation and/or combination of fuel elements described herein. A first example of a fuel is any fuel that both phase changes to a vapor at a very low temperature and has a significant vapor expansion characteristic for aid in driving the double offset rotor 440, such as a nitrogen and/or an ammonia based fuel. A second example of a fuel is a diamagnetic liquid fuel. A third example of a fuel is a liquid having a permeability of less than that of a vacuum and that has an induced magnetism in a direction opposite that of a ferromagnetic material. A fourth example of a fuel is a fluorocarbon, such as Fluorinert liquid FC-77® (3M, St. Paul, Minn.), 1,1,1,3,3-pentafluoropropane, and/or Genetron® 245fa (Honeywell, Morristown, N.J.). A fifth example of a fuel is a plasmatic fluid composed of a non-reactive liquid component to which a solid component is added. The solid component is optionally a particulate held in suspension within the liquid component. Preferably the liquid and solid components of the fuel have a low coefficient of vaporization and a high heat transfer characteristic making the plasmatic fluid suitable for use in a closed-loop engine with moderate operating temperatures, such as below about 400° C. (750° F.) at moderate pressures. The solid component is preferably a particulate paramagnetic substance having non-aligned magnetic moments of the atoms when placed in a magnetic field and that possess magnetization in direct proportion to the field strength. An example of a paramagnetic solid additive is powdered magnetite ($Fe_3O_4$) or a variation thereof. The plasmatic fluid optionally contains other components, such as an ester-based fuel lubricant, a seal lubricant, and/or an ionic salt. The plasmatic fluid preferably comprises a diamagnetic liquid in which a particulate paramagnetic solid is suspended as when the plasmatic fluid is vaporized the resulting vapor carries a paramagnetic charge, which sustains an ability to be affected by an electromagnetic field. That is, the gaseous form of the plasmatic fluid is a current carrying plasma and/or an electromagnetically responsive vapor fluid. The exothermic release of chemical energy of the fuel is optionally used as a source of power.

The fuel is optionally an electromagnetically responsive fluid and/or vapor. For example, the electromagnetically responsive fuel contains a salt and/or a paramagnetic material.

The engine system 100 is optionally run in either an open loop configuration or a closed loop configuration. In the open loop configuration, the fuel is consumed and/or wasted. In the closed loop system, the fuel is consumed and/or recirculated.

Power Stroke

The power stroke of the rotary engine 110 occurs when the fuel is expanding exerting the expansive force 743 and/or is exerting the vortical force 744. In a first example, the power stroke occurs from through about the first 180 degrees of rotation, such as from about the twelve o'clock position to the about six o'clock position. In a second example, the power stroke or a power cycle occurs through about 360 degrees of rotation. In a third example, the power stroke occurs from when the reference cell is in approximately the one o'clock position until when the reference cell is in approximately the six o'clock position. From the one o'clock to six o'clock position, the reference cell preferably continuously increases in volume. The increase in volume allows energy to be obtained from the combination of vapor hydraulics, adiabatic expansion forces 743, and/or the vortical forces 744 as greater surface areas on the leading vane are available for application of the applied force backed by simultaneously increasing volume of the reference cell. To maximize use of energy released by the vaporizing fuel, preferably the curvature of housing 210 relative to the rotor 450 results in a radial cross-sectional distance or a radial cross-sectional area that has a volume of space within the reference cell that increases at about a golden ratio, φ, as a function of radial angle. The golden ratio is defined as a ratio where the lesser is to the greater as the greater is to the sum of the lesser plus the greater, equation 2.

$$\frac{a}{b} = \frac{b}{a+b} \quad \text{(eq. 2)}$$

Assuming the lesser, a, to be unity, then the greater, b, becomes φ, as calculated in equations 3 to 5.

$$\frac{1}{\phi} = \frac{\phi}{1+\phi} \quad \text{(eq. 3)}$$

$$\phi^2 = \phi + 1 \quad \text{(eq. 4)}$$

$$\phi^2 - \phi - 1 = 0 \quad \text{(eq. 5)}$$

Using the quadratic formula, limited to the positive result, the golden ratio is about 1.618, which is the Fibonacci ratio, equation 6.

$$\phi = \frac{1+\sqrt{5}}{2} \cong 1.618033989 \quad \text{(eq. 6)}$$

Hence, the cross-sectional area of the reference chamber as a function of rotation or the surface area of the leading vane 450 as a function of rotation is preferably controlled by geometry of the rotary engine 110 to increase at a ratio of about 1.4 to 1.8 and more preferably to increase with a ratio of about 1.5 to 1.7, and still more preferably to increase at a ratio of about 1.618 through any of the power stroke from the one o'clock to about six o'clock position. The ratio is controlled by a combination of one or more of use of: the double offset rotor geometry 400, use of the first cut-out 510 in the housing 210, use of the build-up 610 in the housing 210, and/or use of the second cut-out 520 in the housing. Further, the fuels described maintain about adiabatic expansion to a high ratio of gas/liquid when maintained at a relatively constant temperature by the temperature controller 770.

Vane Wing-Tips

Herein vane wings are defined, which extend away from a body of the vane 450. Certain elements are described for a leading vane wing, that extends into a leading chamber and certain elements are described for a trailing wing, that extends into a trailing expansion chamber. Any element described with reference to the leading vane wing is optionally applied to the trailing wing. Similarly, any element described with reference to the trailing wing is optionally applied to the leading wing. Further, the rotary engine 110 optionally runs clockwise, counter clockwise, and/or is reversible from clock-wise to counter clockwise rotation.

The leading wing-tip and trailing wing-tip are optionally of any geometry. However, the preferred geometry of the wing-tips reduces chatter or vibration of the vane-tips against the housing during operation of the engine. Chatter is unwanted opening and closing of a seal between the expansion chamber and the leading chamber. The unwanted opening and closing results in unwanted release of pressure from the expansion chamber, because the vane is pushed away from the inner wall of the housing 430, with resulting loss of expansion chamber pressure and rotary engine 110 power.

Optionally, one or more of a leading vane wing-tip and a trailing wing tip are added to the vane 450. The leading wing-tip extends from about a vane-tip proximate the housing 430 into the leading chamber and the trailing wing-tip extends from about the vane-tip into the trailing chamber or reference expansion chamber. For example, the outer edge of the wing-tips, proximate an inner wall of the housing 430, is progressively further from the inner wall of the housing 430 as the wing-tip extends away from the vane-tip. Some optional wing-tip shape elements include:

an about perpendicular wing-tip bottom adjoining the vane body;

a curved wing-tip surface proximate the housing 430;

an outer vane wing-tip surface extending further from the inner wall of the housing 430 with increasing distance or rotational distance from a central point of the vane-tip;

an inner vane wing-tip surface having a decreasing distance to the inner wall of the housing with increasing distance or rotational distance from a central point of the vane-tip; and a 3, 4, 5, 6, or more sided polygon perimeter in an x-, y-cross-sectional plane of an individual wing tip, such as the leading wing-tip or trailing wing-tip.

A t-shaped vane refers to a vane 450 having both a leading wing-tip 1620 and trailing wing-tip 1630.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. An apparatus, comprising:
a rotary engine, comprising:
 a rotor configured to rotate in a stator, said stator comprising about a first primarily elliptical inner wall,
 said rotor offset along both an x-axis and a y-axis relative to a center of said inner wall of said stator, wherein said x-axis and said y-axis form an x/y plane perpendicular to a rotatable shaft extending through said rotor;
 a vane configured to span a distance between said rotor and said stator, said vane comprising a vane tip configured to proximately maintain contact with said inner wall as a function of rotation of said rotor, said vane configured to extend and retract as a function of rotation of said rotor, wherein a twelve o'clock position comprises a point of rotation of said rotor of first extension of said vane,
 wherein said inner wall of said stator further comprises:
  a first cutout, said vane configured to extend into said first cutout;
  a second cutout, said vane configure to extend into said second cutout; and
  a build-up.

2. The apparatus of claim 1, wherein said rotary engine comprises:
an expander engine.

3. The apparatus of claim 1, wherein said first cut-out comprises:
a first cutout variation of said inner wall within a one o'clock to three o'clock position, said first cutout variation configured to allow extension of said vane tip to a first extension distance exceeding a first original vane extension distance to said first primarily elliptical inner wall at about a two o'clock position.

4. The apparatus of claim 3, wherein said build-up comprises:
a build-up variation of said inner wall within a five o'clock to seven o'clock position, said build-up variation configured to allow extension of said vane tip to a maximum build-up extension distance less than a non-build-up vane extension distance to said first primarily elliptical inner wall at about a six o'clock position.

5. The apparatus of claim 4, further comprising:
a first cross-sectional area of an expansion chamber between said rotor and said stator, said first cross-sectional area on a first plane co-planar with said vane when said vane is positioned at said two o'clock position; and a second cross-sectional area between said rotor and said stator, said second cross-sectional area on a second plane co-planar with said vane when said vane is positioned at said five o'clock position, said second cross-sectional area about 1.5 to 1.7 times said first cross-sectional area.

6. The apparatus of claim 3, wherein said second cut-out comprises:
a second cutout variation of said inner wall within a ten o'clock to twelve o'clock position, said second cutout variation configured to allow extension of said vane tip to a second extension distance exceeding a second original vane extension distance to said first primarily elliptical inner wall at about an eleven o'clock position.

7. The apparatus of claim 6, further comprising:
a curved wing-tip extending from said vane tip.

8. The apparatus of claim 7, said curved wing-tip comprising:
an outer vane wing-tip surface comprising an increasing distance between said outer vane wing-tip surface and an inner wall of said housing with increasing rotational distance from a central point of said vane tip.

9. The apparatus of claim 8, said curved wing tip comprising:
an inner vane wing-tip surface further from said housing relative to said outer vane wing-tip surface proximate said housing, said inner vane wing-tip surface comprising a decreasing distance to said inner wall of said housing with increasing rotational distance from said central point of said vane tip.

10. The apparatus of claim 6, further comprising:
a leading vane element extending from said vane tip proximate said stator into a leading chamber, said leading vane element comprising a five or more sided polygon perimeter in an x-, y-cross-sectional plane of said vane.

11. The apparatus of claim 4, wherein said second cut-out comprises:
a second cutout variation of said inner wall within a ten o'clock to twelve o'clock position, said second cutout variation configured to allow extension of said vane tip to a second extension distance exceeding a second original vane extension distance to said first primarily elliptical inner wall at about an eleven o'clock position.

12. The apparatus of claim 1, wherein said build-up comprises:
a build-up variation of said inner wall within a five o'clock to seven o'clock position, said build-up variation configured to allow extension of said vane tip to a build-up extension distance less than a non-build-up vane extension distance to said first primarily elliptical inner wall at about a six o'clock position.

13. The apparatus of claim 12, further comprising:
said second cutout variation of said inner wall within a ten o'clock to twelve o'clock position, said second cutout variation configured to allow extension of said vane tip to a second extension distance exceeding a second original vane extension distance to said first primarily elliptical inner wall at about an eleven o'clock position.

14. The apparatus of claim 13, further comprising:
a curved wing-tip extending from said vane tip into a rotationally trailing expansion chamber between said rotor and said stator.

15. The apparatus of claim 1, wherein a tracking orbit of said vane tip comprises a non-elliptical path in said x/y plane.

16. A method, comprising the steps of:
rotating a rotor in a stator of a rotary engine, said stator comprising about a first primarily elliptical inner wall, said rotor offset along both an x-axis and a y-axis relative to a center of said inner wall of said stator, wherein said x-axis and said y-axis form an x/y plane perpendicular to a rotatable shaft extending through said rotor;

spanning a distance between said rotor and said stator with a vane, said vane comprising a vane tip configured to proximately maintain contact with said inner wall as a function of rotation of said rotor; and extending and retracting said vane as a function of rotation of said rotor, wherein a twelve o'clock position comprises a point of rotation of said rotor of first extension of said vane, wherein said step of extending and retracting comprises at least one of:
extending said vane into a first cutout; and
extending said vane into a second cutout.

17. The method of claim 16, further comprising the step of:
converting a liquid fuel to a gaseous state prior to injection of the fuel between said rotor and said stator.

18. The method of claim 16, further comprising the step of:
moving said vane tip along an about elliptical path, said about elliptical path varying sequentially from said about elliptical path at all of:
said first cutout;
a build-up; and
said second cutout.

19. The method of claim 18, further comprising the steps of:
extending said vane tip to a first extension distance exceeding a first original vane extension distance to said about elliptical path at about a two o'clock position, said first cutout of said inner wall within a one o'clock to three o'clock position;

extending said vane tip to a second extension distance less than a non-build-up vane extension distance to said about elliptical path at about a six o'clock position, said build-up of said inner wall within a five o'clock to seven o'clock position; and extending said vane tip to a second extension distance exceeding a second original vane extension distance to said about elliptical path at about an eleven o'clock position, said second cutout of said inner wall within a ten o'clock to twelve o'clock position.

20. The method of claim 19, further comprising the step of:
extending a curved wing-tip extending from said vane tip into said second cut-out.

* * * * *